United States Patent [19]
Oogushi

[11] Patent Number: 5,490,770
[45] Date of Patent: Feb. 13, 1996

[54] VANE PUMP HAVING VANE PRESSURIZING GROOVES

[75] Inventor: Naoki Oogushi, Toyota, Japan

[73] Assignee: Aisin Seiki Kabushiki Kaisha, Kariya, Japan

[21] Appl. No.: 348,162

[22] Filed: Nov. 28, 1994

[30] Foreign Application Priority Data

Nov. 26, 1993 [JP] Japan ................................. 5-297106

[51] Int. Cl.⁶ .......................... F04C 2/344; F04C 15/04
[52] U.S. Cl. .................. 418/27; 418/30; 418/82; 418/268
[58] Field of Search ................ 418/24–27, 30, 418/31, 82, 268

[56] References Cited

U.S. PATENT DOCUMENTS

| 3,598,510 | 8/1971 | Aoki | 418/268 |
| 5,141,418 | 8/1992 | Ohtaki et al. | 418/268 |

FOREIGN PATENT DOCUMENTS

| 57-26294 | 2/1982 | Japan | 418/268 |
| 3-31592 | 2/1991 | Japan | 418/268 |
| 4-339187 | 11/1992 | Japan | |

*Primary Examiner*—John J. Vrablik
*Attorney, Agent, or Firm*—Oblon, Spivak, McClelland, Maier & Neustadt

[57] ABSTRACT

When one chamber of vane pump is located at an end of a discharge process and is compressed at maximum, pressure in the chamber is higher than the discharge pressure of the pump. Vanes are supported in slits of a rotor. A passage connecting the one chamber and inner sides of the vanes in the slits supplies pressure to push the vanes onto an inner surface of a cam-ring of the pump.

15 Claims, 7 Drawing Sheets

VANE PUMP HAVING VANE PRESSURIZING GROOVES

BACKGROUND OF THE INVENTION

1. Field of the Invention

The present invention relates to a vane pump. More particularity, the present invention is directed to a hydraulic system having a vane pump.

2. Background of the Related Art

A conventional vane pump is disclosed in a Japanese Patent Laid-open No. 4(1992)-339187. There, a cylindrical rotor is rotatably supported within a housing, together with a cam-ring. Only the rotation angle of the cam-ring is prevented and the rotor is permitted to rotate by 360 degrees. A ring-shaped space is formed between an outer surface of the rotor and an inner surface of the cam-ring in the housing. A plurality of vanes, located in slits of the rotor, separate a plurality of chambers in the ring-shaped space. A ring-groove is formed on the housing and communicates with the slits. The vanes are pushed onto the inner surface of the cam-ring by centrifugal force and oil pressure acting on the inner side of the vanes in the slits. The oil pressure acting on the inner side of the vanes in the slits is supplied from a discharge port of the vane pump via the ring-groove.

Such a vane pump may be used to supply oil pressure for a power-steering system for a motor vehicle. In operation of the power-steering system, one of two valves is closed and the discharge pressure of the vane pump becomes high. The high discharge pressure is applied to the inner side of the vanes in the grooves so that the pressure strongly pushes the vanes outwardly. However, since the discharge pressure in the ring groove is high, oil in the ring groove leaks past both sides of the vanes and the rotor into the suction side via the ring-groove. The discharge pressure then becomes low and the pressure at the inner side of the vanes in the grooves also becomes low. Therefore, the vanes are not sufficiently pushed onto the inner surface of the cam-ring and oil in the chambers communicating with the discharge port leaks past the outer ends of the vanes into the other chambers. The pumping capacity of such vane pump is thereby lowered.

SUMMARY OF THE INVENTION

It is an object of present invention to prevent oil leaking from a discharge port to a suction port in a vane pump when the discharge pressure of the pump is high.

It is a further object of present invention to prevent oil leaking from a discharge port to a suction port in a vane pump by reducing the oil pressure in a pressurizing groove corresponding to chambers at suction pressure.

According to one embodiment of the invention, the above and other objects are accomplished by a vane pump comprising a housing having a suction port and a discharge port, a cam-ring rotatably disposed in the housing, a rotor having slits and rotatably disposed in the housing and forming a ring-shaped space in cooperation with the cam-ring, vanes radially supported in the slits of the rotor and defining separate chambers in the ring-shaped space, at least one pressurizing groove formed in the housing and communicating with inner sides of the vanes in the slits for applying oil pressure thereto, and a passage connecting one of the chambers which is compressed at maximum with the at least one pressurizing grooves for supplying oil pressure to said at least one pressurizing groove.

According to another feature of the invention, the above and other objects are accomplished by a vane pump comprising a housing having a suction port and a discharge port, a cam-ring rotatably disposed in the housing, a rotor having slits and rotatably disposed in the housing and forming a ring-shaped space in cooperation with the cam-ring, vanes radially supported in the slits of the rotor and defining separate chambers in the ring-shaped space, at least one pressurizing groove formed in the housing and communicating with inner sides of the vanes in the slits for applying oil pressure thereto, and a passage connecting one of the chambers which is immediately downstream of said discharge port with the at least one pressurizing groove for supplying oil pressure to said at least one pressurizing groove.

According to yet another feature of the invention, the above and other objects are accomplished by a hydraulic system comprising a vane pump which has a variable volume discharge, an apparatus using oil pressure discharge from the vane pump and means for controlling the volume discharged from the vane pump. The vane pump comprises a housing having a suction port and a discharge port, a cam-ring rotatably disposed in the housing, a rotor having slits and rotatably disposed in the housing and forming a ring-shaped space in cooperation with the cam-ring, vanes radially supported in the slits of the rotor and defining separate chambers in the ring-shaped space, at least one pressurizing groove formed in the housing and communicating with inner sides of the vanes in the slits for applying oil pressure thereto and a passage connecting one of the chambers which is compressed at maximum with the at least one pressurizing grooves for supplying oil pressure to said at least one pressurizing groove, wherein said one of the chambers is immediately downstream of said discharge port.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
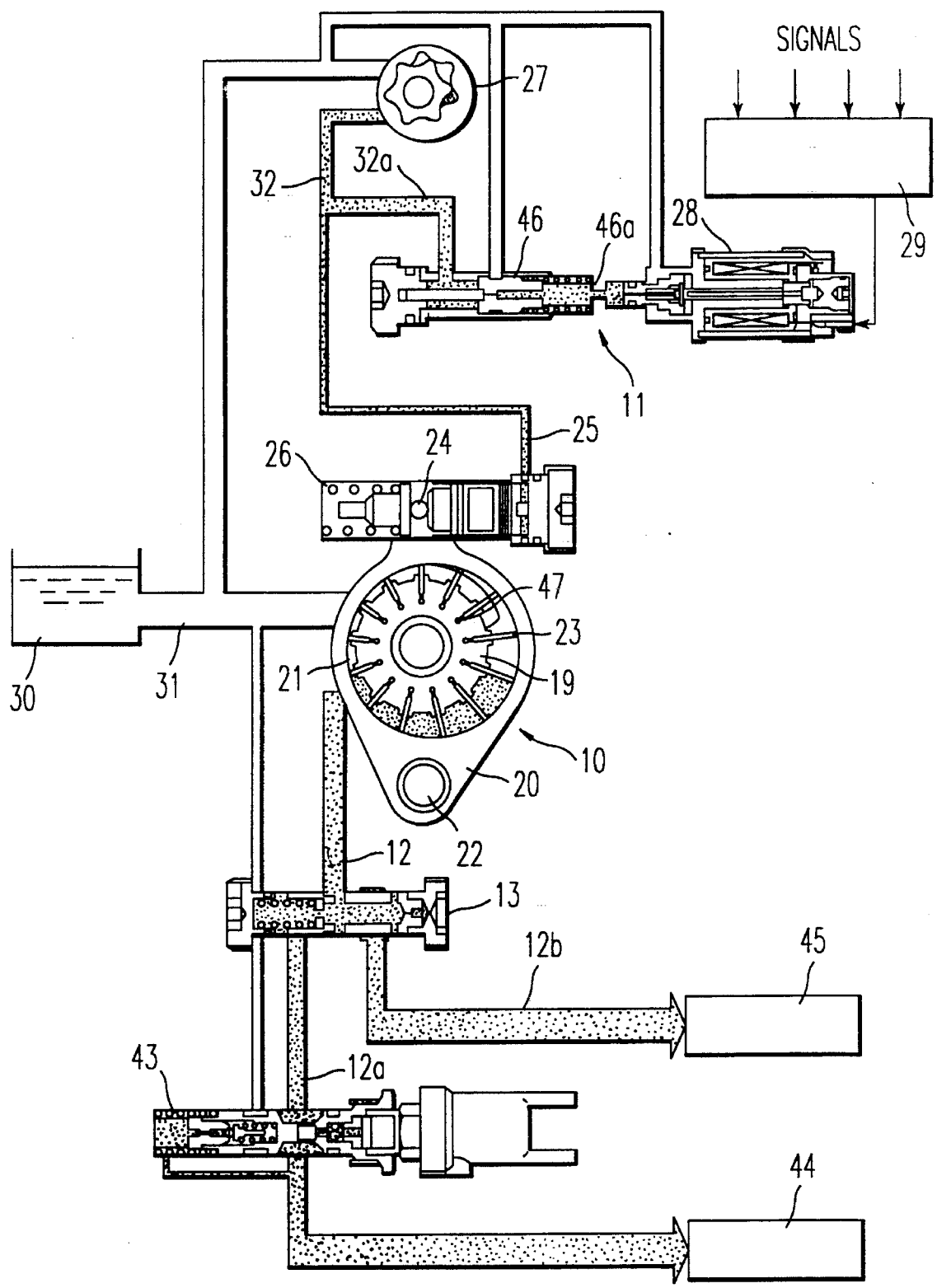
FIG. 1 is a schematic view of a hydraulic system for a motor vehicle using an oil pressure discharged from a vane pump according to an embodiment of the invention.

Referring first to FIG. 1, a hydraulic system for a motor vehicle (not shown) using an oil pressure discharged from a vane pump is shown. The vane pump 10 is controlled by a controller 11 to discharge a variable volume. Oil discharged from the pump 10 is supplied to a power-steering system 44 and a hydraulic motor fan system 45 for the motor vehicle via passages 12, 12a and 12b. A dividing valve 13 is provided for supplying a fixed amount of oil from passage 12 to a first passage 12a and remaining amount of oil from passage 12 to a second passage 12b. An example of such a dividing valve may be found in U.S. Pat. No. 5,398,505.

Figure 2:
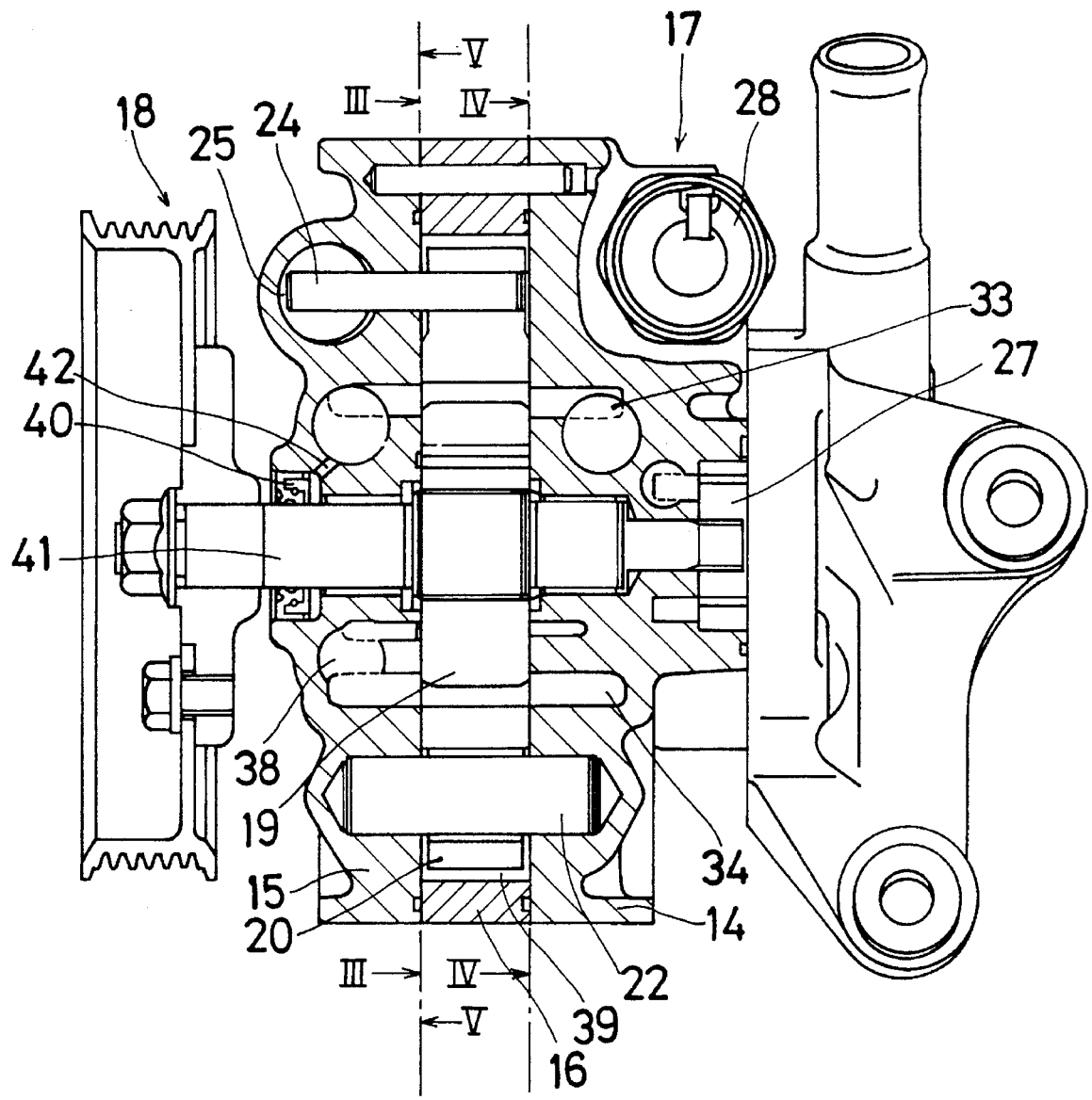
FIG. 2 is a sectional view of the vane pump.
Figure 3:
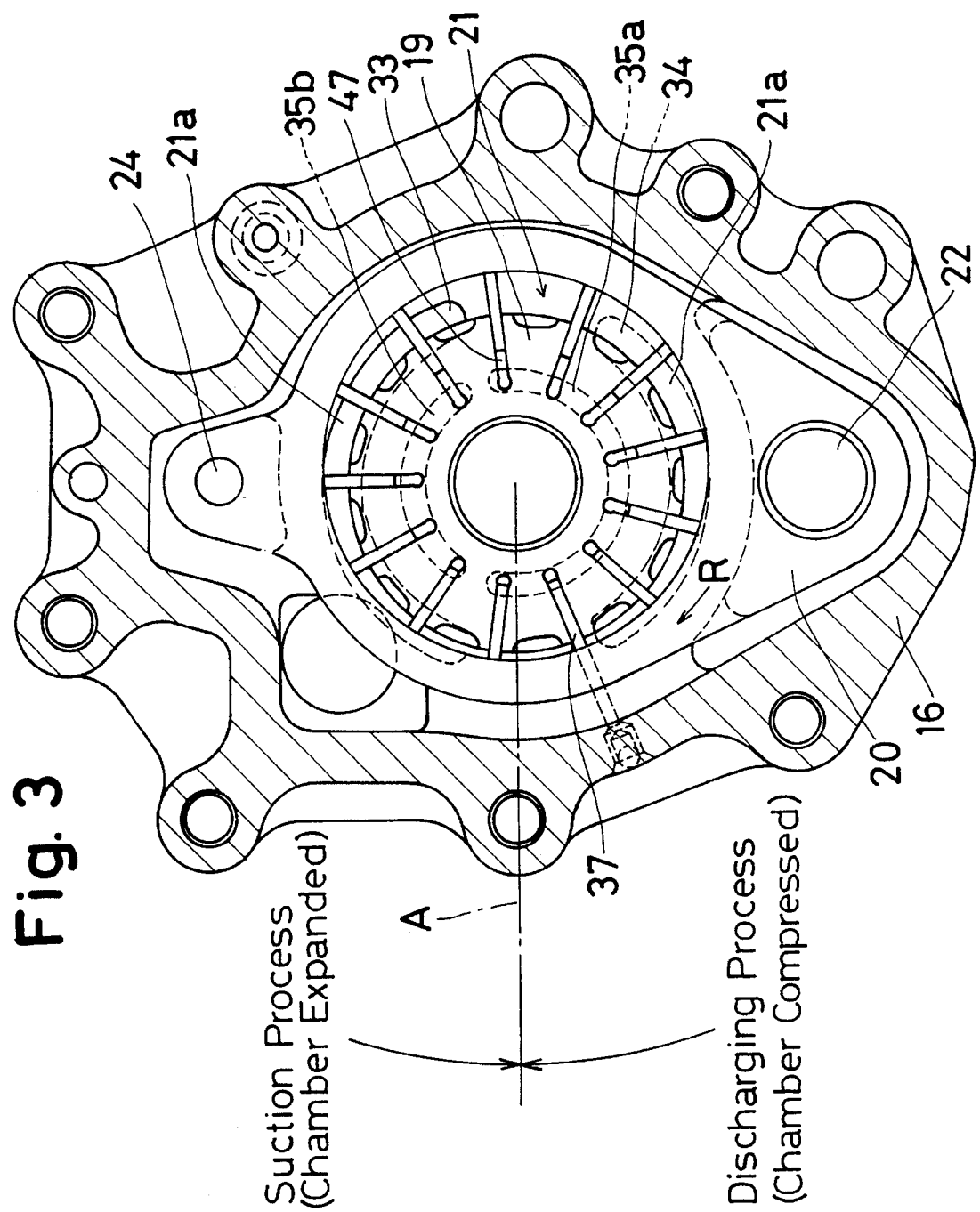
FIG. 3 is a sectional view along section III—III of FIG. 2.

Referring to FIGS. 2 and 3, a housing 17 of the vane pump 10 comprises a front cover 14, a rear cover 15 and a spacer 16. A shaft 41 is rotatably supported in the housing 17. A pulley 18 is fixed to one end of the shaft 41 so as to drive the shaft 41. The pulley 18 is driven by a crank-shaft (not shown) of an engine (not shown) via a belt (not shown). A rotor 19 is fixed to the shaft 41 for unitary rotation therewith. A cam-ring 20 is located around the rotor 19 and a ring-shaped space 21 is formed between the rotor 19 and the cam-ring 20. The space 21 is divided into a plurality of chambers 21a by a plurality of vanes 23.

Upstream of the line A, the chambers 21a are compressed according to the rotation of the vanes 23 (indicated by arrow R in FIG. 3). Downstream of the line A, the chambers 21a are expanded according to the rotation of the vanes 23. The cam-ring 20 pivots around a fulcrum pin 22 supported in the front and rear covers 14 and 15. A difference between a center of the rotor 19 and a center of the cam-ring 20 is variable according to the pivot angle of the cam-ring 20. The vanes 23 are radially supported in slits 47 of the rotor 19. The outer end of each of the vanes 23 is in rotational contact with an inner surface of the cam-ring 20.

The front and rear covers 14 and 15 may be made of aluminum, and the spacer 16 and the rotor 19 may be made of iron. Since the materials of the rotor 16 and the spacer 19 are the same, the degree of thermal expansion of the spacer 16 is equal to that of the rotor 19.

An oil-seal 40 is located around the shaft 41 and prevents oil from leaking to outside of the vane pump 10. Oil collected in the oil-seal 40 flows into the suction port 33 via a return passage 42.

The controller 11 comprises an additional oil pump 27, a linear-controlled solenoid valve 28, a spool valve 46, an electric control unit (ECU) 29 and passages 32 and 32a. The additional oil pump 27 is driven by the shaft 41 and is coaxial with the oil pump 10 on the shaft 41 (FIG. 2). The pump 27 pumps oil from a reservoir tank 30 via a suction passage 31 to the piston 25 via the passage 32.

The passage 32a is branched from the passage 32 and is connected to the linear-controlled solenoid valve 28. The valve 28 controls oil pressure in a chamber 46a of the spool valve 46 and the amount of oil flowing through the bypass passage 32a to the suction side of the pump 27 is thus controlled. The larger the opening of the valve 28, the larger the amount of oil that flows through the passage 32a to the suction side of the pump 27. Output signals of a temperature sensor (not shown) for cooling water of the engine and a revolution sensor (not shown) for the engine are inputted to the ECU 29 to control the linear-controlled solenoid valve 28.

Referring to FIG. 1, a projection 24 of the cam-ring 20 is urged rightwardly by a spring 26 so as to enlarge the difference between the center of the rotor 19 and the center of the cam-ring 20, i.e., to increase the capacity of the pump. On the other hand, the projection 24 is urged leftwardly by the piston 25 so as to reduce the difference between the center of the rotor 19 and the center of the cam-ring 20, i.e., to reduce the capacity of the pump. The difference between the center of the rotor 19 and the center of the cam-ring 20, and so the capacity of the pump, thus depends on a force balance between the spring 26 and the piston 25.

The piston may be urged to the left (as seen in FIG. 1) against the force of the spring 26 by oil pressure from the oil pump 27 via the line 32. The controller 11 controls the oil supply to the piston 25 by selectively opening the bypass line 32a. The projection 24 is urged leftwardly as the oil pressure rises.

Figure 4:
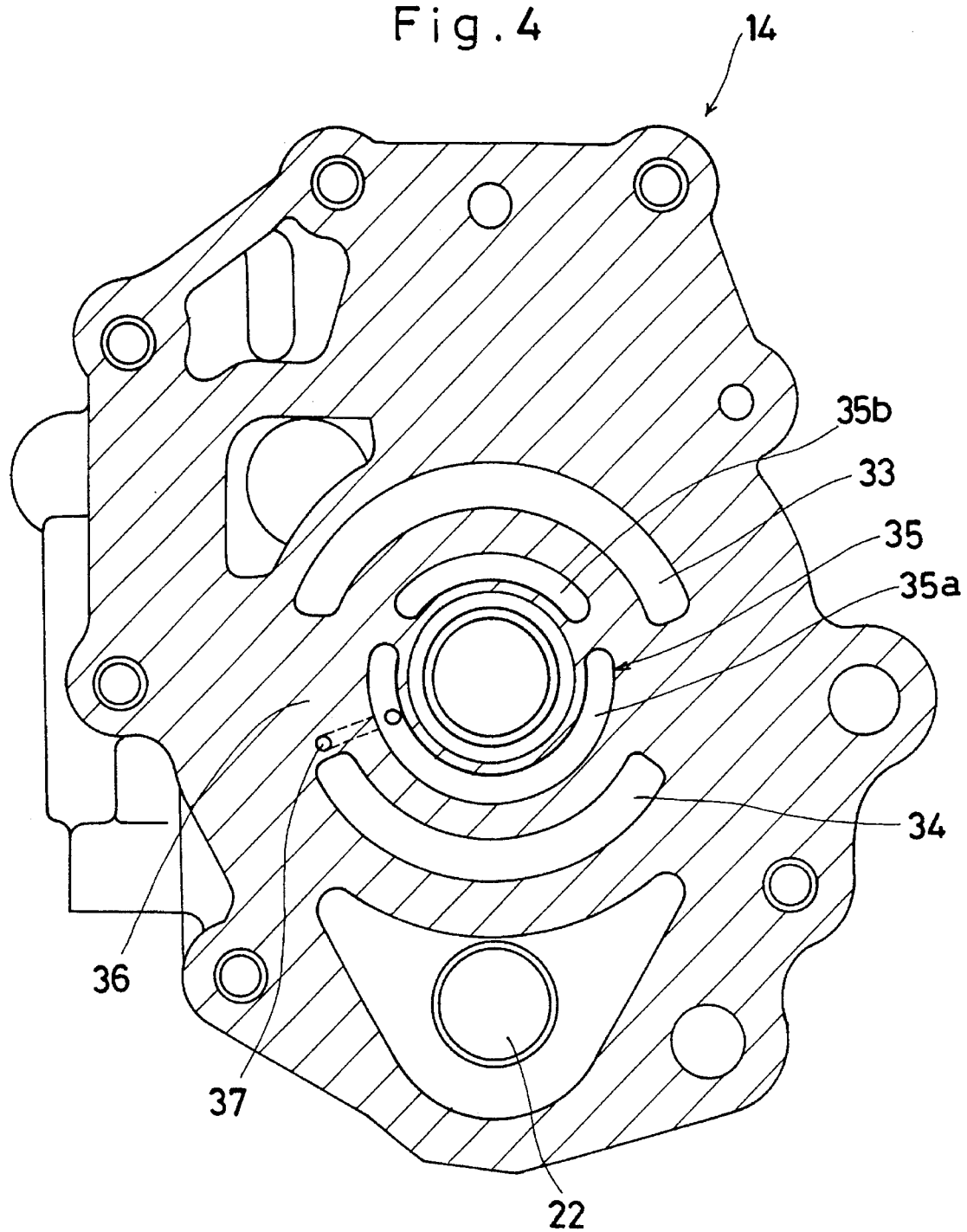
FIG. 4 is a sectional view along section IV—IV of FIG. 2.

Referring to FIG. 4, a suction port 33, a discharge port 34 and pressurizing grooves 35 are formed on the front cover 14. The grooves 35 comprise a discharge-side groove 35a and a suction-side groove 35b. But the groove 35a does not otherwise communicate with the groove 35b. The grooves 35a and 35b supply oil pressure into the slits 47 so as to urge the vanes 23 outwardly. A closed portion 36 is formed on the front cover 15 between the ports 33 and 34 at a left side of the shaft 41 (as seen in FIG. 4).

The volume of a chamber 21b (FIG. 6) at the closing position 36 is the smallest in the volume of chambers 21a. The groove 35a communicates with the chamber 21b via a passage 37 formed in the front cover 14.

When one of vanes 23 is on the position of the line A (FIG. 6), the following one of the vanes 23 is past the downstream end of the discharge port 34 so as to separate the chamber 21b from the discharge port 34. The chamber 21b is in communication with neither the suction port 33 nor the discharge port 34.

Figure 6:
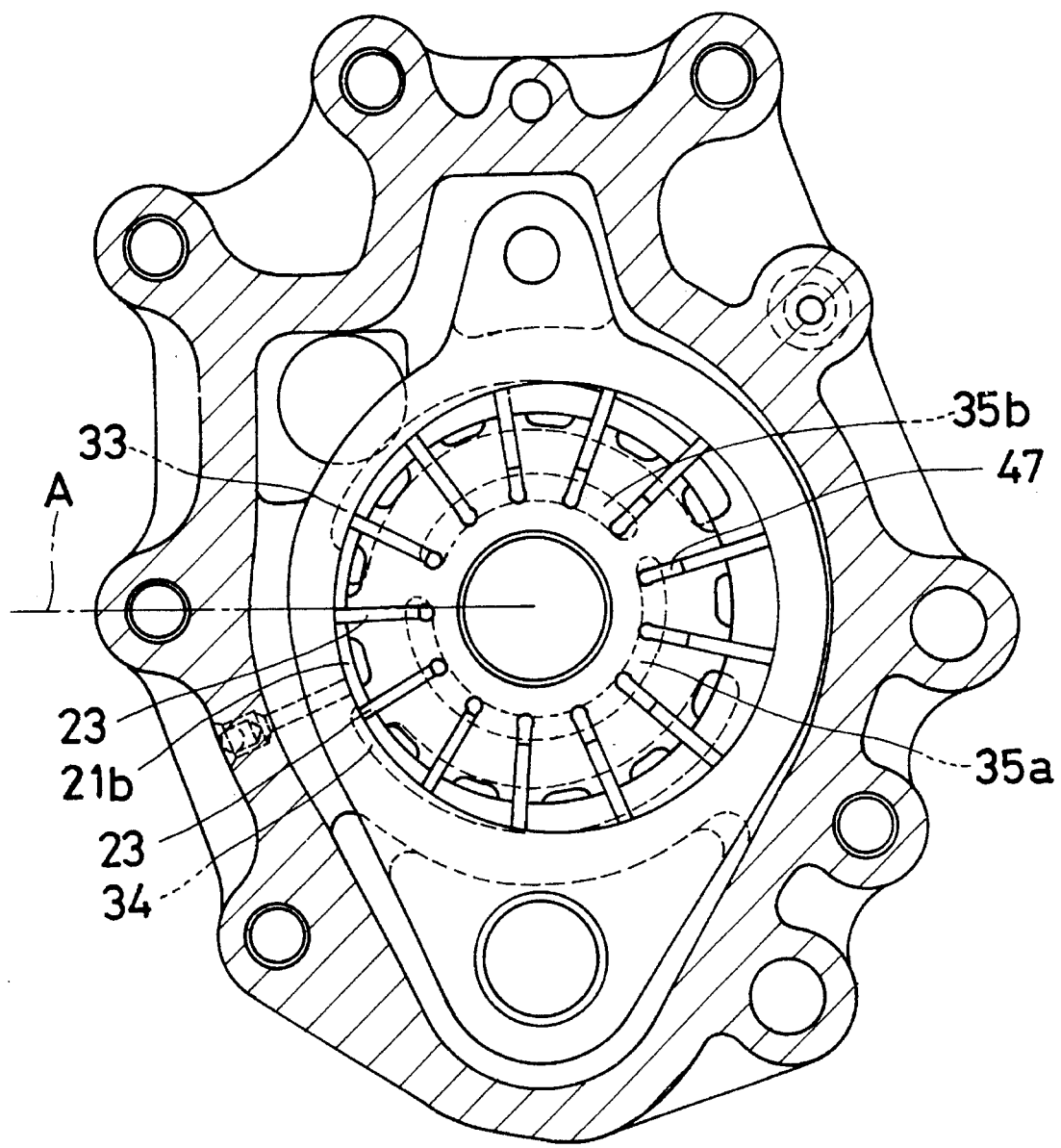
FIG. 6 is similar to FIG. 3, but shows another rotating position of the rotor.
Figure 7:
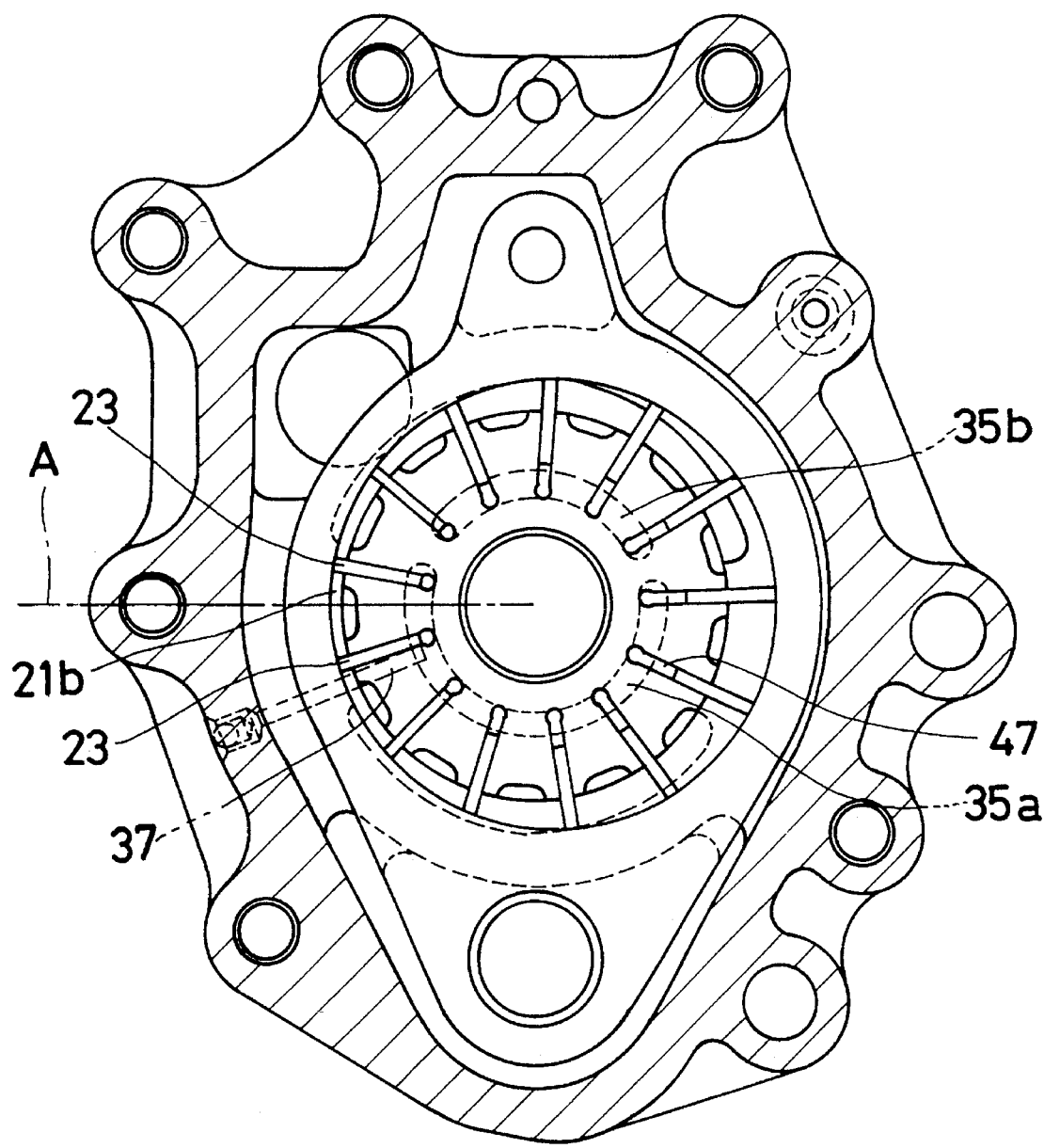
FIG. 7 is similar to FIG. 3, but shows yet another rotating position of the rotor.

The pressure in the chamber 21b shown in FIG. 6 is high since the chamber 21b is at maximum compression. On the other hand, when the vanes 23 are located at a position shown in FIG. 7, the chamber 21b communicates with the suction port and the pressure in the chamber 21b falls. The passage 37 should be in communication with the chamber 21b shown in FIG. 6 so as to supply high oil pressure into the grooves 35a and 35b. Since the pressure in the chamber 21b shown in FIG. 7 is low, the passage 37 must not be in communication with the chamber 21b shown in FIG. 7, so as not to supply low oil pressure into the grooves 35a and 35b.

Moreover, the groove 35a is longer than the groove 35b and the upstream vane of the chamber 21b does not communicate with the grooves 35b until the chamber 21b has reached a position to communicate with the suction port 33. Therefore, the outward force acting on the vanes is always adequate.

Since the vanes 23 are pushed onto the inner surface of the cam-ring 20 by both centrifugal force and the oil pressure acting on the inner side of the vanes in the slits 47, the oil pressure in the grooves 35a must be kept high. Otherwise, the vanes 23 would not be sufficiently pushed onto the inner surface of the cam-ring 20 and oil would leak between the adjacent chambers 21a. Therefore, the passage 37 should be in communication with the chamber 21b only when it is in the position shown in FIG. 6.

Figure 5:
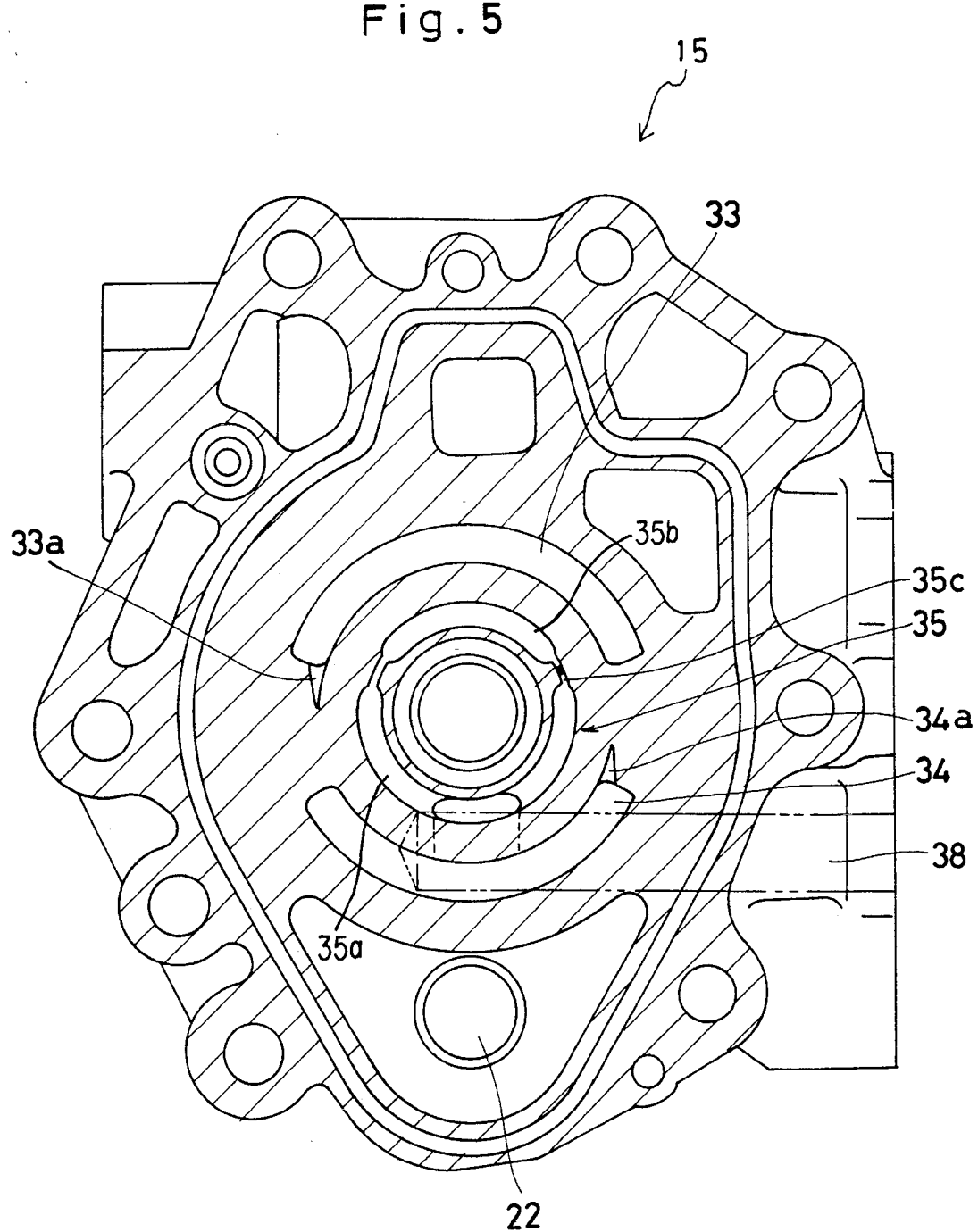
FIG. 5 is a sectional view along section V—V of FIG. 2.

Referring to FIG. 5, the suction port 33, the discharge port 34 and the grooves 35a and 35b are also formed on the rear cover 15. The groove 35a there communicates with the groove 35b via a groove 35c which is restricted. The groove 35a is in communication with the discharge port 34 via the discharge passage 38. A tapered groove 33a is formed on the rear cover 15 at one end of the suction port 33. A tapered groove 34a is formed on the rear cover 15 at one end of the discharge port 34. The grooves 35 on front cover 14 are in communication with the grooves 35 on the rear cover 15 via the slits 47 in the rotor 19.

Referring to FIG. 1, during operation of the power-steering system 44, one of two valves (not shown) of the power steering system 44 is closed and the pressure in the passages 12 and 12a becomes high. Although a relief valve 43 discharges excess pressure in the passage 12 into the tank 30, the capacity of the relief valve 43 is low so that pressure in the discharge port 34 of the vane pump 10 also becomes high. This is abnormal discharged pressure. Groove 35a receives oil pressure from the chamber 21b, which is higher than both normal discharge pressure and abnormal discharge pressure. Therefore, the vanes 23 defining the chambers 21a having oil at high discharge pressure are strongly pushed by the oil pressure in the groove 35a, and outer ends of the vanes 23 strongly press on the inner surface of the cam-ring 20. Oil in the chambers 21a communicating with the discharge port 34 therefore does not leak past the outer ends of the vanes 23 into adjacent chambers 21a.

Since the groove 35b is separated from the groove 35a by the restricted groove 35c, oil pressure in the groove 35b is lower than that in groove 35a. Oil in the chambers 21a will nonetheless not leak past the outer ends of the vanes since the oil will be at less than discharge pressure. Moreover, the lower pressure oil from the groove 35b will not leak from both sides of the vanes into the suction side.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. A vane pump comprising:

a housing having a suction port and a discharge port;

a cam-ring rotatably disposed in the housing;

a rotor having slits and rotatably disposed in the housing and forming a ring-shaped space in cooperation with the cam-ring;

vanes radially supported in the slits of the rotor and defining separate chambers in the ring-shaped space, said chambers each successively communicating with said suction port and said discharge port during rotation of said rotor to pump a fluid in said chambers from said suction port to said discharge port;

a suction side pressurizing groove and a discharge side pressurizing groove formed in the housing and communicating with inner sides of the vanes in the slits for applying oil pressure thereto, said discharge side pressurizing groove having a length greater than that of said suction side pressurizing groove; and a passage connecting one of the chambers which is compressed at maximum with said discharge side pressurizing groove for supplying oil pressure from said one of the chambers to said discharge side pressurizing groove, so that a high oil pressure in said one of the chambers is applied to said discharge side pressurizing groove, wherein said suction side pressurizing groove is positioned such that the inner sides of the vanes defining said one of the chambers do not communicate with said suction side pressurizing groove until said rotor has at least reached a rotational position wherein said one of the chambers communicates with said suction port.

2. The vane pump of claim 1 wherein the one of the chambers is separated from both the suction port and the discharge port.

3. The vane pump of claim 1 wherein the at least one pressurizing groove comprises a suction-side groove and a discharge-side groove, wherein the suction-side groove communicates with the discharge-side groove via a restricted passage.

4. The vane pump of claim 1 wherein said housing comprises front and rear covers on opposite sides of said rotor, wherein the at least one pressurizing groove is formed on both the front cover and the rear cover, and wherein the pressurizing grooves on the front and rear covers communicate with each other via the slits.

5. The vane pump of claim 3 wherein said housing comprises front and rear covers on opposite sides of said rotor, wherein corresponding ones of said suction-side groove and said discharge-side groove are formed on both the front cover and the rear cover, and wherein the corresponding ones of said pressurizing grooves on the front and rear covers communicate with each other via the slits.

6. A vane pump comprising:

a housing having a suction port and a discharge port;

a cam-ring rotatably disposed in the housing;

a rotor having slits and rotatably disposed in the housing and forming a ring-shaped space in cooperation with the cam-ring;

vanes radially supported in the slits of the rotor and defining separate chambers in the ring-shaped space, said chambers each successively communicating with said suction port and said discharge port during rotation of said rotor to pump a fluid in said chambers from said suction port to said discharge port;

a suction said pressurizing groove and a discharge side pressurizing groove formed in the housing and communicating with inner sides of the vanes in the slits for applying oil pressure thereto, said discharge side pressurizing grove having a length greater than that of said suction side pressurizing groove; and a passage connecting one of the chambers which is immediately downstream of said discharge port in the direction of rotation of said rotor with said discharge side pressurizing groove for supplying oil pressure from said one of the chambers to said at least one discharge side pressurizing groove, so that a high oil pressure in said one of the grooves is applied to said discharge side pressurizing groove, wherein said suction side pressurizing groove is positioned such that the inner sides of the vanes defining said one of the chambers do not communicate with said suction side pressurizing groove until said rotor has at least reached a rotational position wherein said one of the chambers communicates with said suction port.

7. The vane pump of claim 6 wherein the one of the chambers is separated from both the suction port and the discharge port.

8. The vane pump of claim 6 wherein the at least one pressurizing groove comprises a suction-side groove and a discharge-side groove, wherein the suction-side groove communicates with the discharge-side groove via a restricted passage.

9. The vane pump of claim 6 wherein said housing comprises front and rear covers on opposite sides of said rotor, wherein the at least one pressurizing groove is formed on both the front cover and the rear cover, and wherein the pressurizing grooves on the front and rear covers communicate with each other via the slits.

10. The vane pump of claim 8 wherein said housing comprises front and rear covers on opposite sides of said rotor, wherein corresponding ones of said suction-side groove and said discharge-side groove are formed on both the front cover and the rear cover, and wherein the corresponding ones of said pressurizing grooves on the front and rear covers communicate with each other via the slits.

11. A hydraulic system, comprising:

a vane pump which has a variable volume discharge;

an apparatus using oil pressure discharge from the vane pump; and means for controlling the volume discharged from the vane pump, wherein the vane pump comprises:

a housing having a suction port and a discharge port;

a cam-ring rotatably disposed in the housing;

a rotor having slits and rotatably disposed in the housing and forming a ring-shaped space in cooperation with the cam-ring;

vanes radially supported in the slits of the rotor and defining separate chambers in the ring-shaped space, said chambers each successively communicating with said suction port and said discharge port during rotation of said rotor to pump a fluid in said chambers from said suction port to said discharge port;

a suction side pressurizing groove and a discharge side pressurizing groove formed in the housing and communicating with inner sides of the vanes in the slits for applying oil pressure thereto, said discharge side pressurizing groove having a length greater than that of said suction side pressurizing groove; and a passage connecting one of the chambers which is compressed at maximum with said discharge side pressurizing groove for supplying oil pressure from said one of said chambers to said discharge side pressurizing groove, wherein said one of the chambers is immediately downstream of said discharge port, so that a high oil pressure in said one of the chambers is applied to said discharge side pressurizing groove, wherein said suction side pressurizing groove is positioned such that the inner sides of the vanes defining said one of the chambers do not communicate with said suction side pressurizing groove until said rotor has at least reached a rotational position wherein said one of the chambers communicates with said suction port.

12. The vane pump of claim 11 wherein the at least one pressurizing groove comprises a suction-side groove and a discharge-side groove, wherein the suction-side groove communicates with the discharge-side groove via a restricted passage.

13. The vane pump of claim 11 wherein said housing comprises front and rear covers on opposite sides of said rotor, wherein the at least one pressurizing groove is formed on both the front cover and the rear cover, and wherein the pressurizing grooves on the front and rear covers communicate with each other via the slits.

14. The vane pump of claim 12 wherein said housing comprises front and rear covers on opposite sides of said rotor, wherein corresponding ones of said suction-side groove and said discharge-side groove are formed on both the front cover and the rear cover, and wherein the corresponding ones of said pressurizing grooves on the front and rear covers communicate with each other via the slits.

15. A hydraulic system of claim 11 wherein the apparatus is a power-steering system.

\* \* \* \* \*